Patented Jan. 14, 1936

2,027,931

UNITED STATES PATENT OFFICE 2,027,931

METHOD OF DEPOSITING SILICA ON MATERIAL

Arthur B. Ray, Bayside, N. Y., assignor to Carbide and Carbon Chemicals Corporation, a corporation of New York No Drawing. Application January 20, 1934.
Serial No. 707,542

20 Claims. (Cl. 91—68)

This invention relates to a method of depositing silica on material.

It has been proposed to use silicic acid esters of monohydric alcohols for depositing silica on material. In order to use such monohydric alcohol silicates, which are oily liquids non-miscible with water, it is almost essential to partially hydrolyze them before they can be used by mixing the monohydric alcohol silicate and water with a common solvent, such as ethanol or methanol.

While such partially hydrolyzed monohydric alcohol silicate solutions are capable of depositing silicia in an adherent form on material, they eventually gel on standing in sealed containers. This is probably due to the colloidal silica present in the partially hydrolyzed monohydric alcohol silicate solutions, and while such solutions will remain liquid for a time, the colloidal silica present eventually coagulates and forms a gel. Since the gel is formed by an irreversible action and because the gel is worthless, it is imperative that partially hydrolyzed monohydric alcohol silicates and condensed silicates be used within a limited time after they are prepared.

This gelling characteristic of partially hydrolyzed monohydric alcohol silicate solutions is decidedly objectionable from the standpoint of commercial distribution and usefulness over any length of time. Further objectionable features are the special procedure required in adding the water, as mentioned above, and the exactness with which the solutions must be prepared in order to prevent the flocculent precipitation of silica, which is liable to occur.

According to the present invention, it is proposed to use silicic acid esters of polyhydric alcohols for depositing silica on material. Polyhydric alcohol silicates, such as the glycol and glycerol silicates, have been found particularly valuable for depositing silica on material in an adherent form, because it is not necessary to partially hydrolyze them before they are applied to materials. Moreover, solutions of these esters in a solvent, such as ethanol or methanol, will not gel even on long standing in sealed containers, because they do not contain colloidal silica.

The polyhydric esters of ortho-silicic acid are preferably prepared by causing the polyhydric alcohol to react with an alkyl silicate in accordance with the equation:

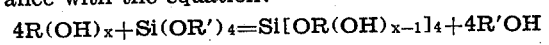

to form the primary polyhydric silicate; or in accordance with the equation:

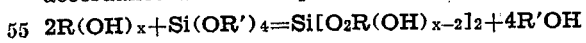

to form the secondary polyhydric alcohol silicate. In the above equations, R and R' represent the alkyl radicals of the alcohols used, and $x$ represents the number of hydroxyl groups in the polyhydric alcohol.

In the preparation of polyhydric alcohol silicates, substantially pure anhydrous glycol or glycerol is used. The theoretical amount of alkyl silicate, for example tetra-ethyl ortho-silicate, is then added to a suitable amount of the anhydrous polyhydric alcohol to give the desired 'ester'. Since the alkyl silicates and the polyhydric alcohols are not miscible at ordinary temperatures, approximately 5 per cent of a mutual solvent, such as ethanol, may be added along with a trace of acid, such as hydrochloric acid, to accelerate the reaction. The speed of the reaction may be increased by heating the mixture. The solvent and the alcohol formed are then distilled off until a solution of the silicate of the desired viscosity is obtained. By controlling the amount of polyhydric alcohol added, one or more of the alcohol hydroxyls may be esterified to form either the primary or secondary glycol silicates, or the primary, secondary, or tertiary glycerol silicates.

The silicates formed from polyhydric alcohols are either very viscous liquids or amorphous solids. Thus, the primary glycerol and glycol silicates are viscous liquids when warm, and strongly gelatinous when cold; and the secondary glycol and secondary and tertiary glycerol silicates are amorphous solids. The polyhydric alcohol silicates in which all of the alcohol hydroxyls are esterified, such as the tertiary glycerol and secondary glycol silicates, are insoluble in water; and the polyhydric alcohol silicates in which only a part of the alcohol hydroxyls are esterified, such as the primary and secondary glycerol and primary glycol silicates, are soluble in water in all proportions.

Since the polyhydric alcohol silicates are either viscous liquids or amorphous solids, they must be dissolved in a solvent, such as alcohol, to be useful for depositing silica on materials in an adherent form. In the preferred method of preparing polyhydric alcohol silicates, as described above, at least a part of the alcohol formed may be utilized as the solvent, and the remainder distilled off from the solution formed. A solution of the secondary glycol silicate in ethanol, which is capable of depositing approximately 25% of its weight of silica, is particularly useful.

When a solution of a polyhydric alcohol silicate dissolved in a volatile solvent is applied to a material, the solvent evaporates; and, as the solvent evaporates, the polyhydric alcohol silicate coagulates or "sets" and forms a gelatinous film. The final hardening of this film is caused by the reaction of the silicate with water to form silica in accordance with the equation, in which the hydrolysis of secondary glycol silicate is shown for purpose of illustration:

$$Si(O_2C_2H_4)_2 + 2H_2O = SiO_2 + 2C_2H_4(OH)_2$$

Because of the great hygroscopicity of the polyhydric alcohols, the silicates readily take up moisture from the air and in certain cases from the material to which they are applied, and react to deposit an adherent film of silica and liberate the polyhydric alcohol.

The polyhydric alcohol silicates are easily prepared, and the solutions formed for depositing silica in an adherent form on material are simple alcoholic solutions which will remain liquid practically indefinitely.

The ability of polyhydric alcohol silicates to deposit adherent silica makes them particularly valuable for producing protective and decorative coatings; for strengthening and preserving shaped porous articles by impregnating such articles with a polyhydric alcohol silicate solution which will react with water and deposit adherent silica in the pores of the article; and for making shaped articles from comminuted material by mixing the same with a polyhydric silicate solution to deposit silica in an adherent form, and then molding the mixture to the desired shape.

In some instances, the adherent film of silica produced is an excellent protective coating in itself because of the fact that, after the solvent evaporates, only inert silica remains. In other cases, however, suitable pigments and fillers may be mixed with a polyhydric alcohol silicate solution to produce decorative coatings on materials. The adherent film of silica produced penetrates into the material and also binds the pigment to the surface of the material.

Polyhydric alcohol silicates may also be used for producing special paints which must protect or decorate surfaces exposed to very high temperatures. Surfaces, such as green plaster, which contain free lime, may also be decorated by paints made with polyhydric alcohol silica solutions, because the silica bond is chemically unaffected by the free lime in the surface of such materials. Moreover, paints made with polyhydric alcohol silicates are unusually brilliant because the pigment is embedded in a transparent film of hard silica.

For preserving and treating shaped articles of porous material which are exposed to the atmosphere, polyhydric alcohol silicates are useful because the deposited silica is not attacked by the action of moisture and atmospheric impurities, such as the sulphur acids. These atmospheric impurities bring about the decay of stone, brick, concrete and plaster by forming calcium sulphate or other salts in the pores of the material. These salts have a disruptive action and cause the material to crumble. By depositing an adherent silica binder in the pores of such material by impregnating the same with a solution of a polyhydric alcohol silicate, the material is strengthened and hardened, and made capable of resisting the action of atmospheric impurities.

The polyhydric alcohol silicates have also been found useful for strengthening and hardening porous articles which are subjected to high temperatures. If desired the article may be so impregnated that the strengthened and hardened portion extends only a short distance in from the surface. An example is the treating and strengthening of the surfaces of sand molds so as to produce castings free from burnt-on sand. Polyhydric alcohol silicates are particularly useful for treating sand molds because, in addition to the deposit of strengthening silica, the polyhydric alcohol is liberated upon decomposition of the silicate. The polyhydric alcohols aid in effecting a clean parting between the castings and sand molds.

Since the polyhydric alcohol silicates deposit adherent silica which is an excellent bonding agent, they are useful in making shaped articles from comminuted material. In making such articles, the comminuted or powdered material may be mixed with a polyhydric alcohol silicate solution. If desired, a small amount of water may be added to accelerate the hydrolysis of the silicate. A small amount of powdered magnesium oxide mixed with the comminuted material will decrease the length of time of "setting" of the silica. The mixture is then molded to the desired shape. In decomposing, the silicate deposits the adhesive silica and liberates the polyhydric alcohol, which evaporates. The evaporation of the polyhydric alcohol may be accelerated by heating. Examples of articles that can be made in this manner are refractory molds for casting high melting alloys, refractory bricks and mortars, electrical insulators and porous articles.

In certain instances it may be desirable to use a solution of a mixture of polyhydric alcohol silicates and condensed silicates, and it will therefore be understood that the terms "silicic acid ester of a polyhydric alcohol" and "polyhydric alcohol silicate" in the claims may include either a single polyhydric alcohol ester in solution or a solution of a mixture of polyhydric alcohol esters of ortho-silicic acid.

I claim:

1. A method of producing a form of silica capable of adhering to material which comprises treating such material with a solution containing a silicic acid ester of a polyhydric alcohol and causing the deposition of silica by hydrolysis.

2. A method according to claim 1, in which the material is treated with a solution containing a silicic acid ester of a glycol.

3. A method according to claim 1, in which the material is treated with a solution containing a silicic acid ester of a glycerol.

4. A method of producing a form of silica capable of adhering to material which comprises treating such material with a solution containing a polyhydric alcohol silicate dissolved in a volatile solvent, whereby such solvent vaporizes and the moisture in the air hydrolyzes the silicate and causes the deposition of silica.

5. A method of producing a protective coating on the surface material of shaped articles which comprises applying to such material a solution containing a silicic acid ester of a polyhydric alcohol capable, upon hydrolysis, of depositing a film of silica which adheres to the surfaces of such articles.

6. A method according to claim 5, in which the surface material is treated with a solution containing a silicic acid ester of a glycol.

7. A method according to claim 5, in which the surface material is treated with a solution containing a silicic acid ester of a glycerol.

8. A method of producing a protective coating on the surface material of shaped articles which comprises applying to such material a solution containing a polyhydric alcohol silicate dissolved in a volatile solvent, whereby such solvent vaporizes and the moisture in the air hydrolyzes the silicate and causes the deposition of a film of silica which adheres to the surfaces of such articles.

9. A method of treating shaped articles of porous material which comprises impregnating such an article with a solution containing a silicic acid ester of a polyhydric alcohol capable, upon hydrolysis, of depositing silica in the pores of the article which adheres to the material and bonds the same together.

10. A method according to claim 9, in which the porous article is impregnated with a solution containing a silicic acid ester of glycol.

11. A method according to claim 9, in which the porous article is impregnated with a solution containing a silicic acid ester of a glycerol.

12. A method of treating shaped articles of porous material which comprises impregnating such an article with a solution containing a silicic acid ester of a polyhydric alcohol dissolved in a volatile solvent, whereby such solvent vaporizes and the silicate reacts with water to hydrolyze the silicate and cause the deposition of silica in the pores of the article which adheres to the material and bonds the same together.

13. A method of treating the outer surfaces of articles of porous material with a form of silica capable of binding the material, which comprises impregnating such an article for a short distance in from a surface thereof with a solution containing a silicic acid ester of a polyhydric alcohol and causing the deposition of silica by hydrolysis.

14. A method of treating the outer surfaces of articles of porous material with a form of silica capable of binding the material, which comprises impregnating such an article for a short distance in from a surface thereof with a solution containing a polyhydric alcohol silicate dissolved in a volatile solvent, whereby such solvent vaporizes and the moisture in the air hydrolyzes the silicate and causes the deposition of silica.

15. A method of binding together comminuted material which comprises mixing with such material a solution containing a silicic acid ester of a polyhydric alcohol capable, upon hydrolysis, of depositing silica which adheres to such material and bonds the same together.

16. A method according to claim 15 in which the comminuted material is mixed with a solution containing a silicic acid ester of a glycol.

17. A method according to claim 15, in which the comminuted material is mixed with a solution containing a silicic acid ester of a glycerol.

18. A method of binding together comminuted material which comprises mixing with such material a solution containing a polyhydric alcohol silicate dissolved in a volatile solvent, whereby such solvent vaporizes and the moisture in the air hydrolyzes the silicate and causes the deposition of silica which adheres to such material and bonds the same together.

19. A method of making shaped articles of comminuted material which comprises mixing with the material a solution containing a silicic acid ester of a polyhydric alcohol and molding such mixture to the desired shape; the silicic acid ester being capable, upon hydrolysis, of depositing silica which bonds the material.

20. A method of making shaped articles of comminuted material which comprises mixing with the material a solution containing a polyhydric alcohol silicate dissolved in a volatile solvent, and molding such mixture to the desired shape, whereby such solvent vaporizes and the silicate is caused to react with water and deposit silica which bonds the material.

ARTHUR B. RAY.